United States Patent
Weber et al.

(10) Patent No.: US 8,762,878 B1
(45) Date of Patent: Jun. 24, 2014

(54) SELECTIVE RENDERING OF DISPLAY COMPONENTS IN A TAB VIEW BROWSER

(75) Inventors: Arnaud Weber, Saratoga, CA (US); Linus Upson, Redwood City, CA (US); Ben Goodger, Mountain View, CA (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1320 days.

(21) Appl. No.: 11/943,055

(22) Filed: Nov. 20, 2007

(51) Int. Cl.
*G06F 3/048* (2013.01)

(52) U.S. Cl.
USPC ........................................................ 715/777

(58) Field of Classification Search
USPC .................... 715/764, 776–777, 781–807
See application file for complete search history.

(56) References Cited

U.S. PATENT DOCUMENTS

| | | | | | |
|---|---|---|---|---|---|
| 6,166,736 | A * | 12/2000 | Hugh | ............................. | 715/798 |
| 7,114,128 | B2 * | 9/2006 | Koppolu et al. | ............... | 715/781 |
| 2006/0155728 | A1 * | 7/2006 | Bosarge | ........................ | 707/100 |
| 2006/0184537 | A1 * | 8/2006 | Sauve et al. | ...................... | 707/10 |
| 2006/0184875 | A1 * | 8/2006 | Okada et al. | ................... | 715/516 |
| 2006/0218500 | A1 * | 9/2006 | Sauve et al. | ...................... | 715/767 |
| 2006/0271861 | A1 * | 11/2006 | Yolleck et al. | ................. | 715/760 |
| 2007/0162864 | A1 * | 7/2007 | Masselle et al. | .............. | 715/765 |
| 2007/0180381 | A1 * | 8/2007 | Rice et al. | ...................... | 715/711 |
| 2008/0065237 | A1 * | 3/2008 | Long | ................................. | 700/3 |
| 2008/0077936 | A1 * | 3/2008 | Goel et al. | .................... | 719/312 |
| 2008/0184137 | A1 * | 7/2008 | Grimm et al. | ................. | 715/760 |
| 2008/0209338 | A1 * | 8/2008 | Li | .................................. | 715/745 |
| 2008/0215996 | A1 * | 9/2008 | Vega et al. | ..................... | 715/760 |
| 2008/0301562 | A1 * | 12/2008 | Berger et al. | ................. | 715/733 |
| 2009/0044134 | A1 * | 2/2009 | Cave et al. | ..................... | 715/762 |
| 2010/0011313 | A1 * | 1/2010 | Sauve et al. | ................... | 715/777 |
| 2010/0070484 | A1 * | 3/2010 | Kraft et al. | ..................... | 707/706 |

OTHER PUBLICATIONS

Microsoft Corporation; "Internet Explorer 6: Home"; 2007. Downloaded from http://www.microsoft.com/windows/ie/ie6/default.mspx on Dec. 21, 2007; 2 pages.

Microsoft Corporation; "Internet Explorer 6: Features"; 2007. Downloaded from http://www.microsoft.com/windows/ie/ie6/evaluation/features/default.mspx/ on Dec. 21, 2007; 3 pages.

Microsoft Corporation; "Internet Explorer: Home Page"; 2007. Downloaded from http://www.microsoft.com/windows/products/winfamily/ie/default.mspx on Dec. 21, 2007; 3 pages.

Microsoft Corporation; "Internet Explorer: Home Page (Tabs)"; 2007. Downloaded from http://www.microsoft.com/windows/products/winfamily/ie/default.mspx on Dec. 21, 2007; 3 pages.

(Continued)

*Primary Examiner* — Enrique Iturralde (74) *Attorney, Agent, or Firm* — Sterne, Kessler, Goldstein & Fox PLLC (57) ABSTRACT

The present invention relates to systems and methods for selective rendering of display components in a web browser. In an embodiment, a system for providing tabbed views at a browser includes a plurality of tabs and at least one renderer for each tab in the plurality of tabs that receives an identifier (for example, but not limited to, a URL) of content visited by the browser. The renderer then selectively renders a user interaction cluster and a content area corresponding to the identifier depending on whether the respective tab is newly instantiated.

19 Claims, 12 Drawing Sheets

(56) References Cited

OTHER PUBLICATIONS

Microsoft Corporation; "Internet Explorer: The Features"; 2007. Downloaded from http://www.microsoft.com/windows/products/winfamily/ie/features.mspx on Dec. 21, 2007; 3 pages.

Apple Inc.; "Apple—Safari 3 Public Beta"; 2007. Downloaded from http://www.apple.com/safari/ on Dec. 21, 2007; 2 pages.

The Camino Project; Camino. Features; 2007. Downloaded from http://caminobrowser.org/features/ on Dec. 21, 2007; 4 pages.

The Camino Project; "Camino. Mozilla Power, Mac Style"; 2007. Downloaded from http://caminobrowser.org/ on Dec. 21, 2007; 2 pages.

Mozilla; "Firefox Web Browser—Faster, more secure & customizable"; 2007. Downloaded from http://www.mozilla.com/en-US/firefox/ on Dec. 21, 2007; 2 pages.

Mozilla; "Firefox Web Browser—Features: Faster, more secure & customizable"; 2007. Downloaded from http://www.mozilla.com/en-US/firefox/features.html on Dec. 21, 2007; 6 pages.

Opera Software ASA; "Opera browser: Home page". Downloaded from http://www.opera.com/ on Dec. 21, 2007; 2 pages.

Opera Software ASA; "Opera browser: Features". Downloaded from http://www.opera.com/products/desktop/features/ on Dec. 21, 2007; 4 pages.

Opera Software ASA; "Flash Demos/Tutorials—Opera Web Browser". Downloaded from http://www.opera.com/support/tutorials/flash/tabs/ on Dec. 21, 2007; 2 pages.

Opera Software ASA; "Flash Demos/Tutorials—Opera Web Browser: Step 3". Downloaded from http://www.opera.com/support/tutorials/flash/tabs/ on Dec. 21, 2007; 2 pages.

* cited by examiner

SELECTIVE RENDERING OF DISPLAY COMPONENTS IN A TAB VIEW BROWSER

BACKGROUND OF THE INVENTION

1. Field of the Invention

The present invention relates to web browser technology.

2. Related Art

Computer systems include user interfaces that allow users to interact with the computer's hardware, software, and data. A user interface includes a means to output data to the user, and a means for the user to input data. To output data, a user interface may include a display that provides a visual representation of data. To input data, a user interface may have a means to select a point on the display. For example, the user may be able to select a point on the display using a pointer that is controlled by a mouse or keyboard. In another example, the user may be able to select a point on the display using a touch screen interface.

Web browsers are a type of user interface. Web browsers (also called browsers) are used to access pages. The location of such pages is often identified by a location address such as a uniform resource locator (URL). A browser may use a URL to access the content associated with the URL. In an example, the content may be accessed across one or more networks, such as the Internet. Content may include, for example, a web page, application, document, video, multimedia content, future utilized content mechanism, or any combination thereof. Browsers may display content in a content area. A user can interact with a browser, for example, to direct a browser to different pages.

The INTERNET EXPLORER 6 browser from MICROSOFT is a type of web browser. Other examples of browsers are the SAFARI browser from APPLE, the OPERA browser from OPERA SOFTWARE, and the CAMINO browser available at http://www.caminobrowser.org/.

The INTERNET EXPLORER 6 browser presents each content area in its own window. Each window has a user interaction area. The user interaction area may have, for example, a back button, a forward button, or a history drop down menu. Each window remembers the sequence of pages visited. The user interaction area depends on the sequence of pages visited. For example, the history drop down menu may display the sequence of pages visited and allow the user to select content to revisit.

Each window also has associated controls, which allow the window to be moved, minimized, maximized, and stacked. Managing windows is useful for many business applications. However, as more windows are opened, managing the windows can become tedious for the user. Users of web browsers often need to view many different pages. Having a window for each content area makes managing the windows tedious.

Because managing a window for each content area can be tedious, some web browsers provide a tabbed interface. The FIREFOX 2 browser, available at http://www.mozilla.com/, is an example of a browser with a tabbed interface. In a tabbed interface, each content area can be displayed in a different tab. In a single window, only one content area is visible at a time. If a user selects a tab, a content area associated with the tab is displayed. Each browser window can contain many tabs, allowing the user to open many pages inside a single window. For this reason, having a content area per tab is easier for the user to manage than having a content area per window in a browser.

While being easier to manage than traditional windows, this tab per content area approach can be confusing and inefficient. The FIREFOX 2 browser has a one-to-many correspondence between the user interaction area and tabs. The FIREFOX 2 browser uses the same user interaction area for multiple tabs, each with its own current content area and sequence of pages visited. Because the user interaction area depends on the sequence of pages visited, the user interaction area has to update every time a different tab is selected.

Also, the FIREFOX 2 provides only one set of navigation controls for multiple tabs. This one-to-many correspondence can cause the user to get confused and disoriented when moving between tabs. Disorientation may be pronounced when the user has a large number of tab instances open in a single browser window. Improved tabbed browser systems and methods are needed that are less disorienting.

BRIEF SUMMARY OF THE INVENTION

The present invention relates to systems and methods for selective rendering of display components in a web browser. In an embodiment, a system for providing tabbed views at a browser includes a plurality of tabs and at least one renderer for each tab. A renderer is provided for each respective tab that receives an identifier of content visited by the browser. The renderer then selectively renders a user interaction cluster and a content area corresponding to the identifier depending on whether the respective tab is newly instantiated.

In another embodiment, a method for providing tabbed views at a browser is provide. The method includes receiving an identifier of content visited by the browser, and rendering selectively a user interaction cluster and a content area corresponding to the identifier depending upon whether a tab is newly instantiated.

In this way, web browsers may combine each instantiated tab with its own unique set of controls. This provides the benefits of tabbed browsing while being less disorienting and more efficient.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

The present invention relates to systems and methods for selective rendering of display components in a tab view browser. In embodiments of this invention, tabbed browsing is made more efficient and less disorienting for the user.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "identifier" used herein refers to a content address. An example of an identifier is a uniform resource locator (URL). URLs may address content stored across one or more networks, such as the Internet. In another example, an identifier may be a path corresponding to a location of a locally store file. These examples are illustrative and are not intended to limit the definition.

The term "content area" used herein refers to an area of a user interface display that can display content addressed by an identifier. As an illustrative example, the content displayed in the content area may include, for example, a web page, application, document, video, multimedia content, future utilized content mechanism, or any combination thereof. These examples are not meant to limit the definition.

The term "avatar" used herein refers to a visual representation of the current user profile as well as several other web browsing states.

This detailed description of embodiments of the present invention is divided into several sections. The first section describes a tabbed browsing system according to an embodiment of this invention with respect to FIG. 1-3. The second section describes various methods according to embodiments of this invention, which may be used in operation of the tabbed browsing system. The third section describes an example user interface display of the tabbed browsing system.

System

Figure 1:
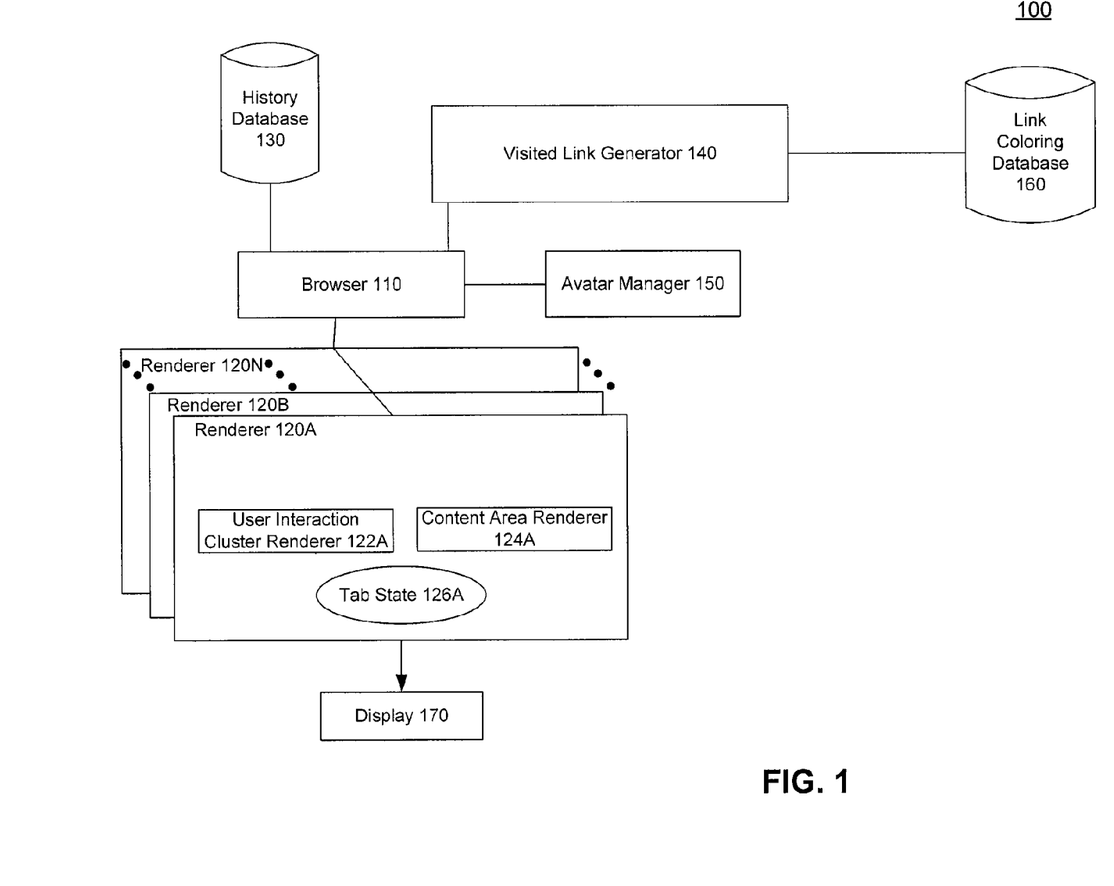
FIG. 1 is an architecture diagram of a tabbed browsing system according to an embodiment of this invention.
Figure 2A:
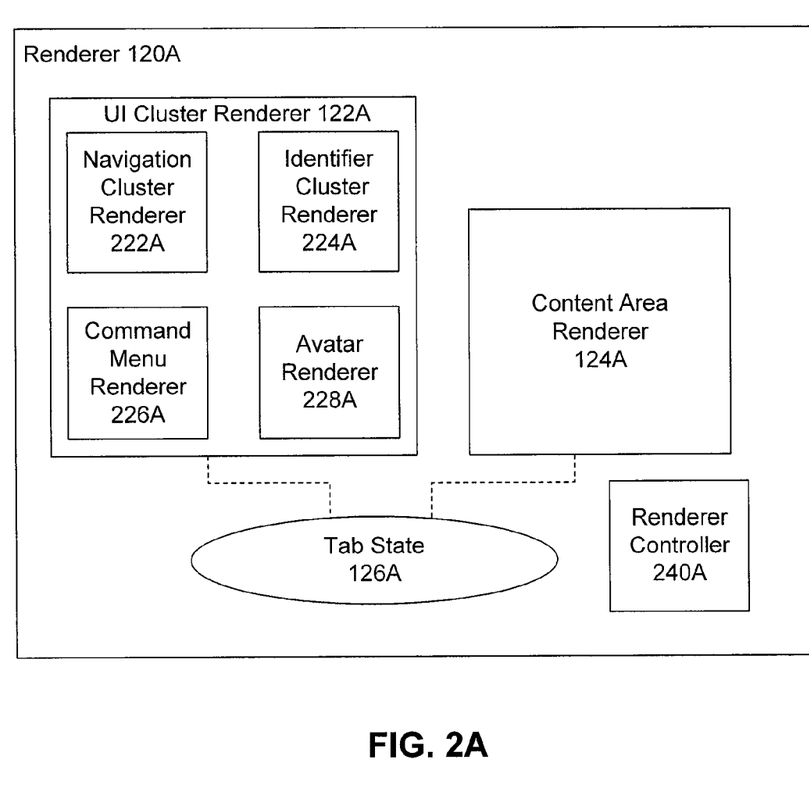
FIG. 2A is an architecture diagram of a component of the system in FIG. 1 that renders a tab.
Figure 2B:
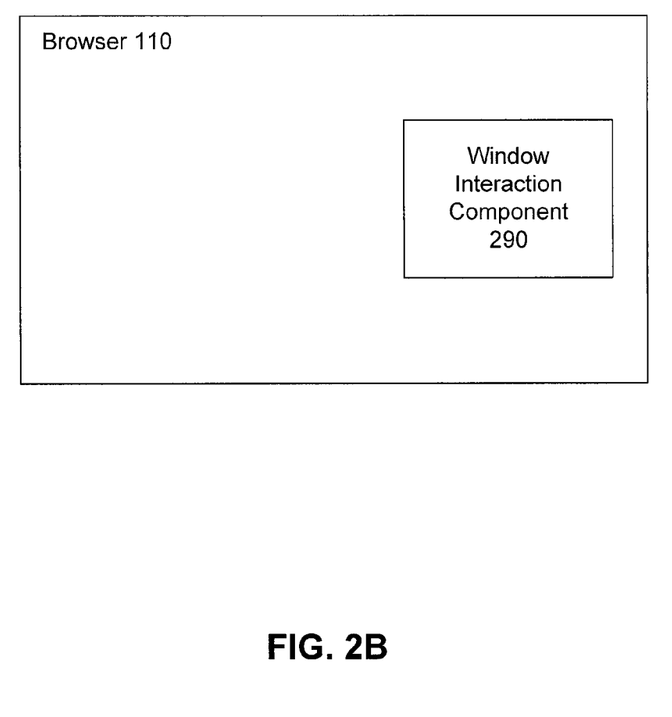
FIG. 2B is an architecture diagram of a component of the system in FIG. 1.
Figure 3:
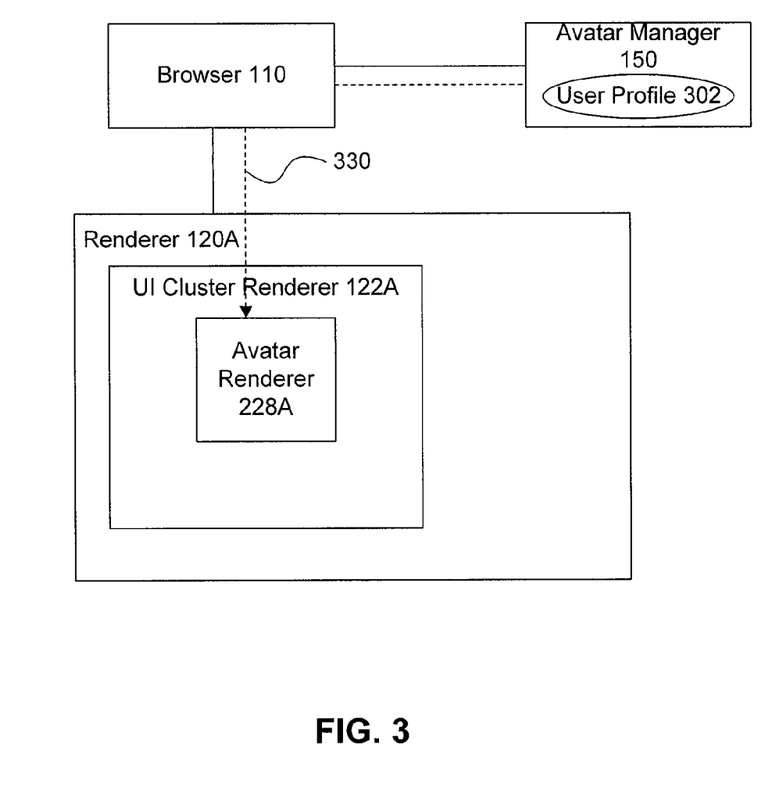
FIG. 3 is an architecture diagram of components of the system in FIG. 2A related to the state of the tabbed browsing system.

This section describes a tabbed browsing system according to an embodiment of this invention with respect to FIG. 1-3.

FIG. 1 is an architecture diagram of a tabbed browsing system according to an embodiment of this invention. FIG. 1 contains tabbed browsing system 100.

System 100 may be implemented on any client device that can support web browsing. Such a client device can include, but is not limited to, a personal computer, mobile device such as a mobile phone, workstation, embedded system, game console, television, set-top box, or any other computing device that can support web browsing. Such a client device may include, but is not limited to, a device having a processor and memory for executing and storing instructions. Such a client device may include software, firmware, and hardware. Software may include one or more applications and an operating system. Hardware can include, but is not limited to, a processor, memory and graphical user interface display. An optional input device, such as a mouse, may be used.

Tabbed browsing system 100 may contact a remote server and download data to display. In examples, the data may be represented as hypertext markup language, dynamic hypertext markup language, extendable markup language, image data, video, sound. In another example, tabbed browsing system 100 may download and execute scripts according to the AJAX (Asynchronous JavaScript and XML) framework. The AJAX framework asynchronously transmits and receives data from a server to update a content area without reloading the content area.

Tabbed browsing system 100 includes a browser 110 coupled to a history database 130, an avatar manager 150, and renderer 120A-N. Each renderer 120A-N contains a respective user interaction cluster renderer 122, content area renderer 124, and tab state 126. Renderers 120A-N are shown for clarity, but this is only an example, and in practice one or more renderers may be used.

Each of the components of tabbed browsing system 100, browser 110, history database 130, avatar manager 150, and one or more renderers 120, may be implemented as software, hardware, firmware, or any combination thereof.

Browser 110 can communicate with one or more web servers (not shown) over one or more networks, such as the Internet. Browser 110 can further communicate with an input (not shown) to allow a user to input data, to input commands, or to provide other control information to browser 110. Renderer 120 can render data for display at a client device running browser 110. For instance, renderer 120 can render a content area and its associated user interaction cluster for display.

Each renderer 120A-N may be implemented on a thread representing an independent sequence of instructions. Various threads may run asynchronously (time independently) from one another. Multiple threads may be contained within a process, or each thread may be an independent process.

For clarity, the specification may describe functional components and operation with respect to renderer 120A. However, each renderer 120B-N may have their own instantiations of the components described with respect to renderer 120A. Similarly, each renderer 120B-N may have a similar operation to renderer 120A. Therefore, it should be understood that any description of renderer 120A may also apply to each renderer 120B-N.

Renderer 120A is discussed in more detail with respect to FIGS. 1 and 2A. Renderer 120A renders a tab, including a content area and a user interaction cluster. Renderer 120A may have a separate user interaction cluster renderer 122A, a content area renderer 124A, a tab state 126A, and a renderer controller 240A. The user interaction cluster renderer 122A renders the user interaction cluster in the tabbed view browser. The content area renderer 124A renders the content area content specified by the identifier. The tab state 126A stores information related to the tab. Each tab can also run a renderer 120A to support rendering of the user interaction cluster and the content area for that tab instance.

Once renderers 120A-N render their corresponding tabs, the tabs get displayed by display 170. Display 170 can display data to a user. Display 170 may be, for example, a computer monitor. In another example, display 170 may be a projector. These examples are illustrative and are not intended to limit the present invention.

In this embodiment, the architecture of renderer 120A makes tabbed browsing less disorienting. Because each renderer 120A has its own user interaction cluster renderer 122A, each tab rendered by each renderer 120A will have its own user interaction cluster. As discussed earlier, a user interaction cluster depends on a sequence of pages visited by the tab. Each tab has a different sequence of pages visited. When there is only one user interaction cluster for a plurality of tabs, the user interaction cluster has to update as the user switches between tabs, because each tab has a different sequence of pages visited. This updating can cause the user to get disoriented. However, in this embodiment renderer 120A renders a separate user interaction cluster for each tab. Each user interaction cluster depends on the sequence of pages visited by its particular tab. Therefore, updating is not required as the user switches between tabs. As a result, in this embodiment the architecture of renderer 120A makes tabbed browsing less disorienting.

Avatar manager 150 stores the user profile and controls the appearance of an avatar on the user interface display. This is described in more detail below.

FIG. 2A is an architecture diagram of a component of the system in FIG. 1 that renders a tab. FIG. 2A shows a renderer 120A. As discussed earlier, renderer 120A includes user interaction (UI) cluster renderer 122A, content area renderer 124A, and tab state 126A. Renderer 120A also may contain a renderer controller 240A. Renderer controller 240A controls the various components of renderer 120A.

Each of the components of renderer 120A, user interaction (UI) cluster renderer 122A, content area renderer 124A, tab state 126A, and renderer controller 240A, may be implemented as software, hardware, firmware, or any combination thereof.

In the embodiment shown, user interaction cluster renderer 122A includes a navigation cluster renderer 222A, an identifier cluster renderer 224A, a command menu renderer 226A, and an optional avatar renderer 228A. In other examples, user interaction cluster renderer 122A may include one or more of those components. In those examples, the components that are not included in user interaction cluster renderer 122A may be shared among the tabs.

Each of navigation cluster renderer 222A, identifier cluster renderer 224A, command menu renderer 226A, and optional avatar renderer 228A may be implemented as software, hardware, firmware, or any combination thereof.

Navigation cluster renderer 222A renders a navigation cluster. An example of the navigation cluster may include forward and back buttons. The forward and back buttons allow the user to navigate through the sequence of pages visited. (See, for example, navigation cluster 712 in FIG. 7).

Identifier cluster renderer 224A renders an identifier cluster. An example of the identifier cluster may include a navigation bar. The navigation bar presents the identifier of the current content area and an input to navigate to a different content area. (See, for example, identifier cluster 706 in FIG. 7).

The command menu renderer 226A renders a command menu. (See, for example, command menu 710 in FIG. 7).

FIG. 2B is an architecture diagram of a component of the system in FIG. 1. FIG. 2B shows browser 110. Browser 110 also contains a window interaction component 290. Window interaction component 290 communicates with a windowing system. The windowing system may be coupled to an operating system including, but not limited to, the WINDOWS XP operating system, from MICROSOFT. The windowing system manages windows, including instantiating new windows. For example, if browser 110 needed to instantiate a new window, browser 110 may use window interaction component 290 to request a new window from the windowing system. Window interaction component 290 may be implemented in hardware, software, firmware, or any combination thereof.

FIG. 3 is an architecture diagram of components of the system in FIG. 2 to display an avatar. The avatar is an icon that represents the current user profile as well as many other web browsing states. FIG. 3 contains browser 110, avatar manager 150, and renderer 120A. As discussed earlier, renderer 120A includes user interaction cluster renderer 122A, which in turn contains an avatar renderer 228A. Avatar manager 150 contains a user profile 302. Avatar renderer 228A receives data from avatar manager 150 as shown at 330.

User profile 302 maintains information about the user preferences. The user preferences may include security preferences, privacy preferences, and certain display preferences. Avatar manager 150 manages presentation of the avatar based on user profile 302. Avatar renderer 228A renders the avatar as specified by avatar manager 150.

Operation

This section describes various methods that may be used in operation of the system described in FIGS. 1-3. For clarity, the methods are described with respect to system 100, however they are not intended to be limited to system 100. First, this section discusses the operation of renderer 120A with respect to FIG. 4. Second, this section discusses the operation of browser 110 and window interaction component 290, with respect to FIGS. 5 and 6.

Figure 4:
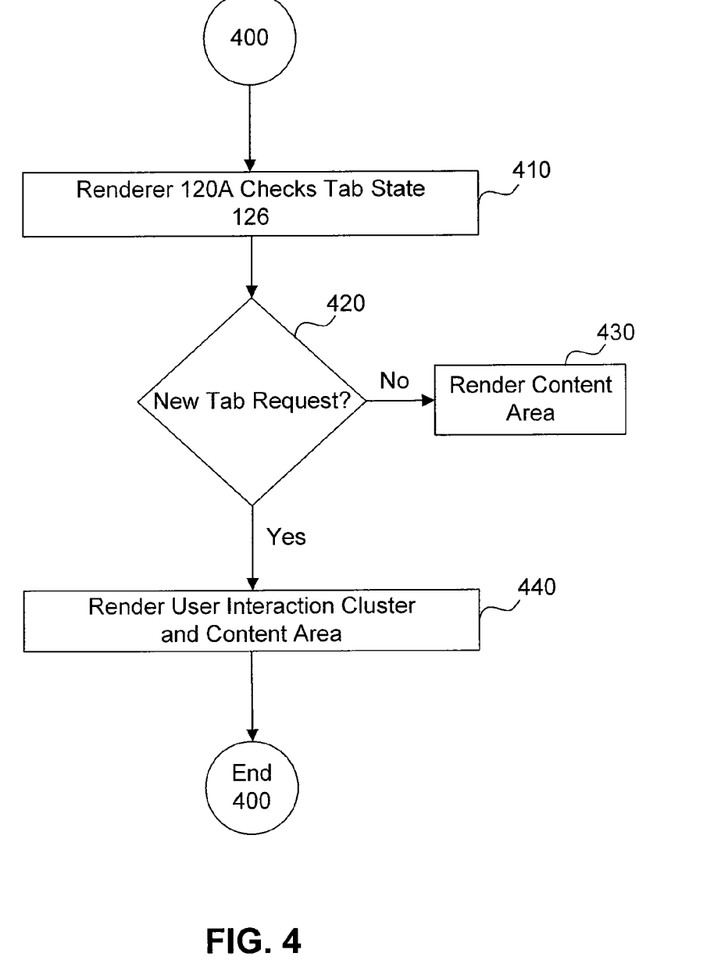
FIG. 4 is a flowchart illustrating a method according to an embodiment of this invention, which may be used in operation of the rendering component described in FIG. 2A.

FIG. 4 is a flowchart illustrating an operation of renderer 120A. FIG. 4 contains method 400. Method 400 may be executed when the user interface display for renderer 120A is updated. As an illustrative example, the user interface display for renderer 120A may be updated when a new tab is created or when the user navigates to a new content area.

Method 400 begins with renderer 120A checking tab state 126A at a step 410. In an example, tab state 126A may be old or new. When the tab is newly instantiated, tab state 126A is new, otherwise tab state 126A is old. Method 400 changes control depending on whether the tab is old or new at decision gate 420. If the tab is new, renderer 120A renders the user interaction cluster and the content area. If the tab is old, renderer 120A renders only the content area. In an example, the user interaction cluster may be rendered by user interaction cluster renderer 122A, and the content area may be rendered by content area renderer 124A.

Figure 7:
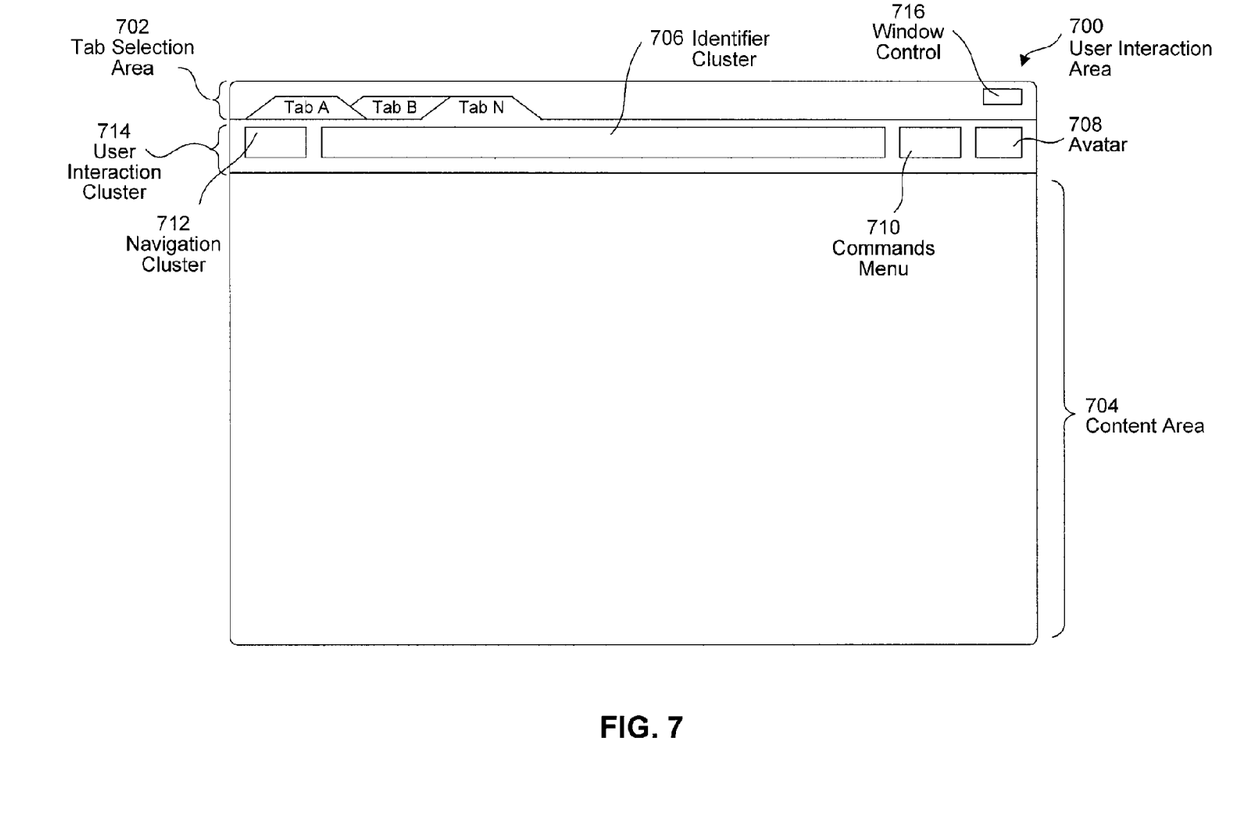
FIG. 7 illustrates an example user interface interaction area of the tabbed browsing system in FIG. 1.

Referring now to FIGS. 4 and 7 to illustrate the operation of method 400, several examples are now described. As a first example, suppose system 100 opens a new tab. For example, this may be triggered by an input from the user (not shown). As indicated by step 410, renderer 120A checks tab state 126A. Because in this example it is a newly instantiated tab, tab state 126A is determined to be "new". Decision step 420 then directs control to step 440. At step 440, renderer 120A renders user interaction cluster 714 and content area 704.

As a second example, suppose the user of system 100 navigates to a new content area. This may be triggered by the user entering a new identifier into an input (identifier cluster 706) on user interaction cluster 714. As indicated by step 410, renderer 120A checks tab state 126A. Because in this example it is not a newly instantiated tab, tab state 126A is determined to be "old". Decision gate 420 then directs control to step 430. At step 430, renderer 120A renders content area 704.

In this way, user interaction cluster 714 is only rendered for newly instantiated tabs. It produces a more satisfying and less disorienting user experience, as each instantiated tab has its unique set of controls resulting in a one-to-one correspondence between the controls, the tab, and the associated content. This one to one correspondence is retained for multiple instantiations of a tab in a browser window.

Figure 5:
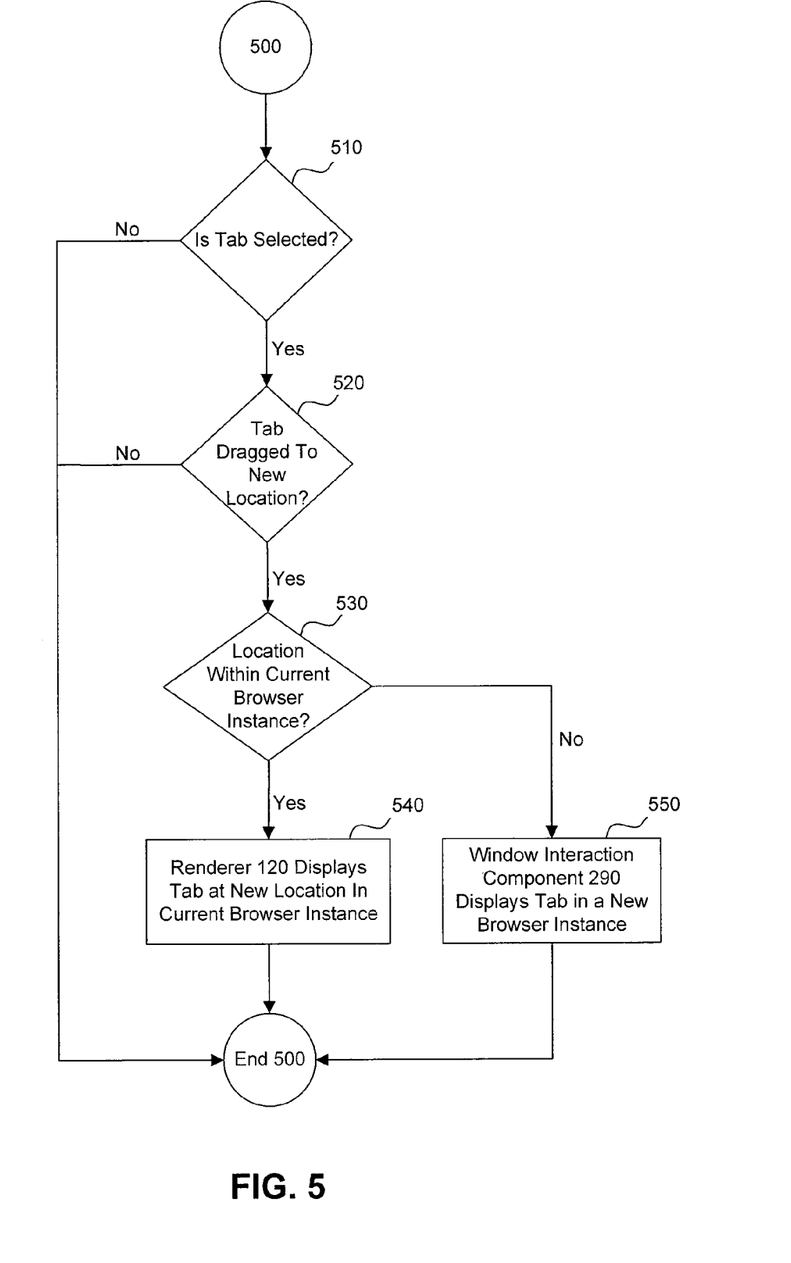
FIG. 5 is a flowchart illustrating a method for dragging a tab that is a component to the tabbed browsing system in FIG. 1.

Referring now to FIGS. 5 and 7, a flowchart is shown illustrating the operation of system 100 when a user drags (selects) a tab. FIG. 5 contains a method 500 (steps 510-550). Method 500 begins with browser 110 checking whether a tab was selected by a user input, as indicated in a step 510. In an example, the user input may be a pointer controlled by an input device, such as a mouse. If the tab is selected, browser 110 evaluates whether the user input has moved the tab to a new location on display 170, as indicated by a step 520. If the tab has been moved to a new location on display 170, browser 110 evaluates whether the new location of the tab lies within user interaction area 700, as indicated by a step 530. If the new location of the tab lies within user interaction area 700, renderer 120A displays the tab at the new location within display 170, as indicated by a step 540. If the new location of the tab lies outside user interaction area 700, window interaction component 290 displays the tab in a new browser instance, as indicated by a step 550.

Figure 6:
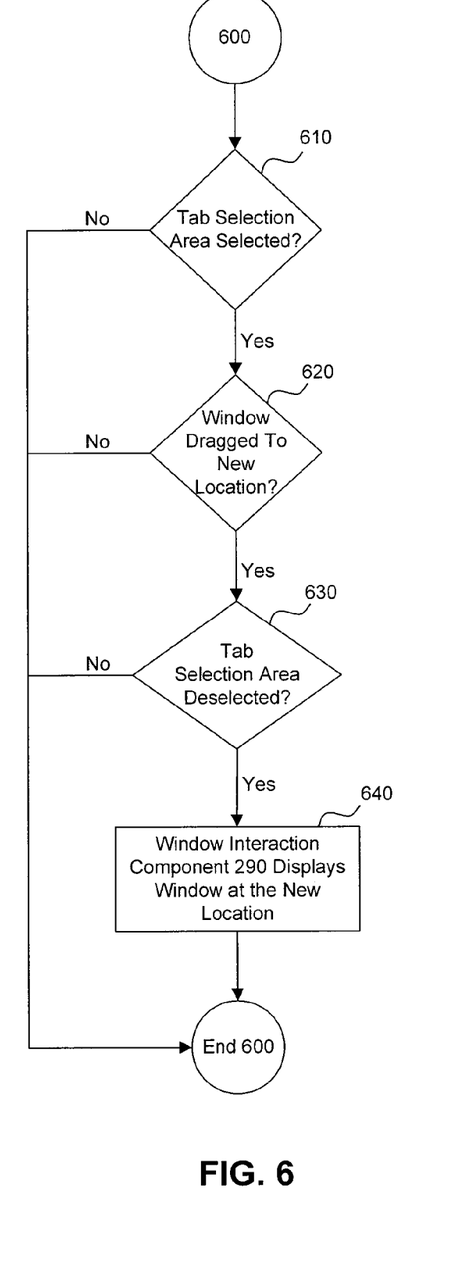
FIG. 6 is a flowchart illustrating a method for dragging a window of the tabbed browsing system in FIG. 1.

Referring to FIGS. 6 and 7, a flowchart is shown illustrating the operation of system 100 when a user drags a window (user interaction area 700). FIG. 6 contains a method 600. Method 600 begins with browser 110 checking whether tab selection area 702 was selected by the user input (not shown), as indicated at step 610. In an example, the user input may be a pointer controlled by a mouse. If tab selection area 702 is selected, browser 110 evaluates whether the user input has moved tab selection area 702 to a new location (step 620). If tab selection area 702 has been moved to a new location, browser 110 evaluates whether tab selection area 702 has been deselected (step 630). If the tab selection area 702 has been deselected, window interaction component 290 displays the window at the new location (step 640).

Example User Interface

An example user interaction area according to an embodiment is shown in FIG. 7. FIG. 7 contains a user interaction area 700. User interaction area 700 may be, for example, a window. User interaction area 700 includes the functionality of a user interface display that displays data to a user and input fields on the display that a user may use to enter data.

User interaction area 700 contains a window control 716, tab selection area 702, user interaction cluster 714, and content area 704. Window control 716 controls the display of user interaction area 700. In the example where user interaction area 700 is a window, window control 716 may provide buttons to minimize, to maximize, to close the window, or to provide other control over the window.

Tab selection area 702 may contain various tabs A-N. Selecting a tab A-N displays a corresponding user interaction cluster 714 and content area 704. Each tab A-N may display a different user interaction cluster 714 and content area 704. For example, suppose tab A is currently selected. The content area 704 and user interaction cluster 714 that are displayed are associated with tab A. Thereafter, a user may select tab B. Selecting tab B displays a different user interaction cluster 714 and content area 704 that are associated with tab B.

According to a feature, tab selection area 702 may be at the top of user interaction area 700. In another example, tab selection area 702 may be located on the side, the bottom, or other desired location.

Content area 704 displays content area data. Content area 704 may be rendered by content area renderer 124A. For example, content area 704 may display data represented as HTML. As another example, content area 704 may display AJAX (Asynchronous JavaScript and XML) interactive components.

User interaction cluster 714 displays information and enables a user to provide input(s) related to a tab and/or a content area. User interaction cluster 714 contains a navigation cluster 712, identifier cluster 706, commands menu 710, and an optional avatar 708. Navigation cluster 712 provides navigation buttons, such as forward, back, or stop. Identifier cluster 706 may, for example, display the identifier of the current content area, reload the current content area, provide an input to navigate to a new identifier and/or retrieve an identifier from a history of past identifiers. An optional avatar 708 may represent the current user profile as well as other web browsing states. Avatar 708 may be generated using avatar manager 150. Commands menu 710 presents a list of other commands. Such commands may include, but are not limited to, print, save, copy, paste, or other commands.

Figure 8A:
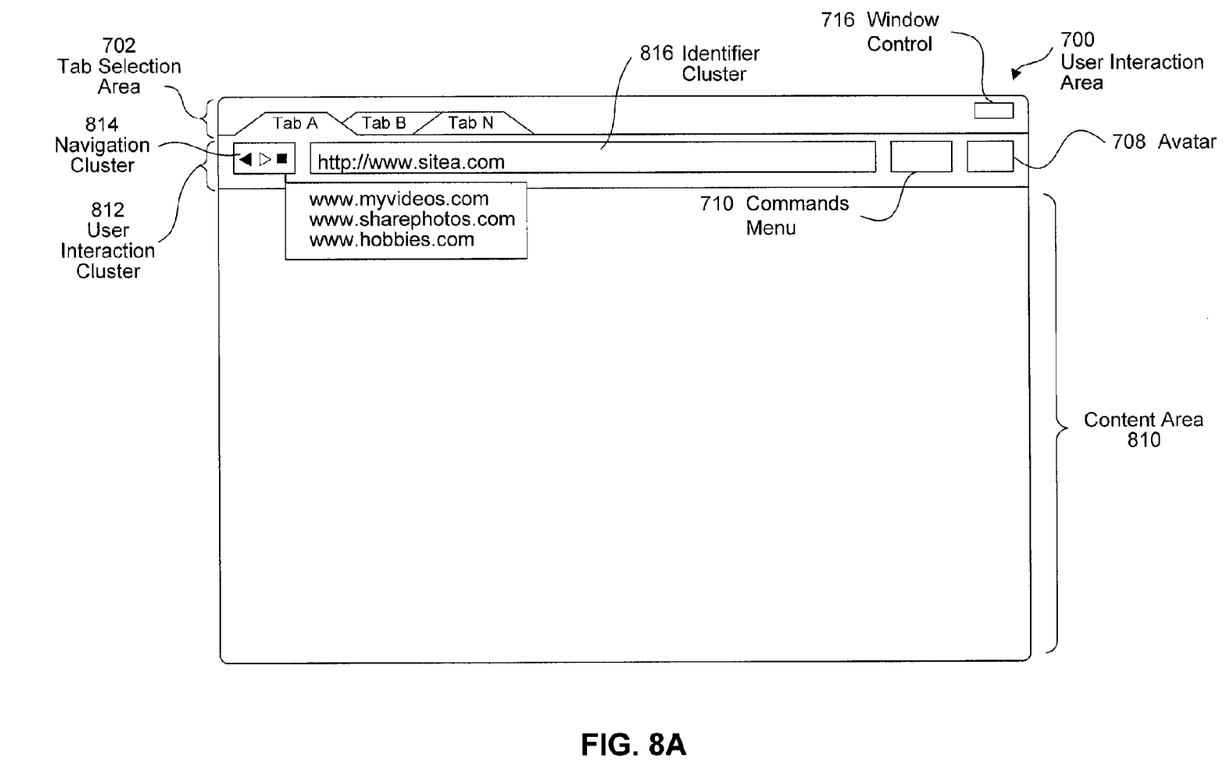
FIG. 8A through 8C are screenshots of the user interface interaction area of FIG. 7 with different tabs selected.
Figure 8B:
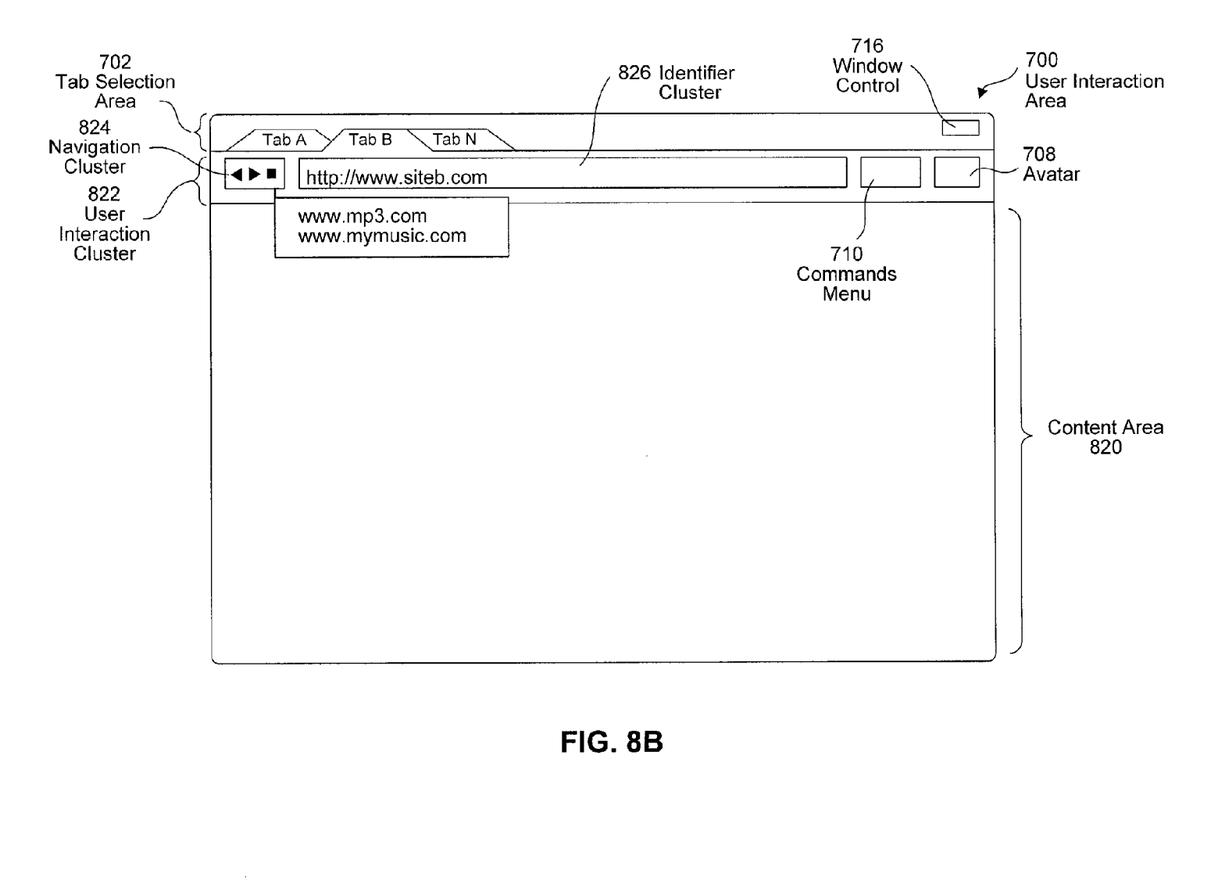
Figure 8C:
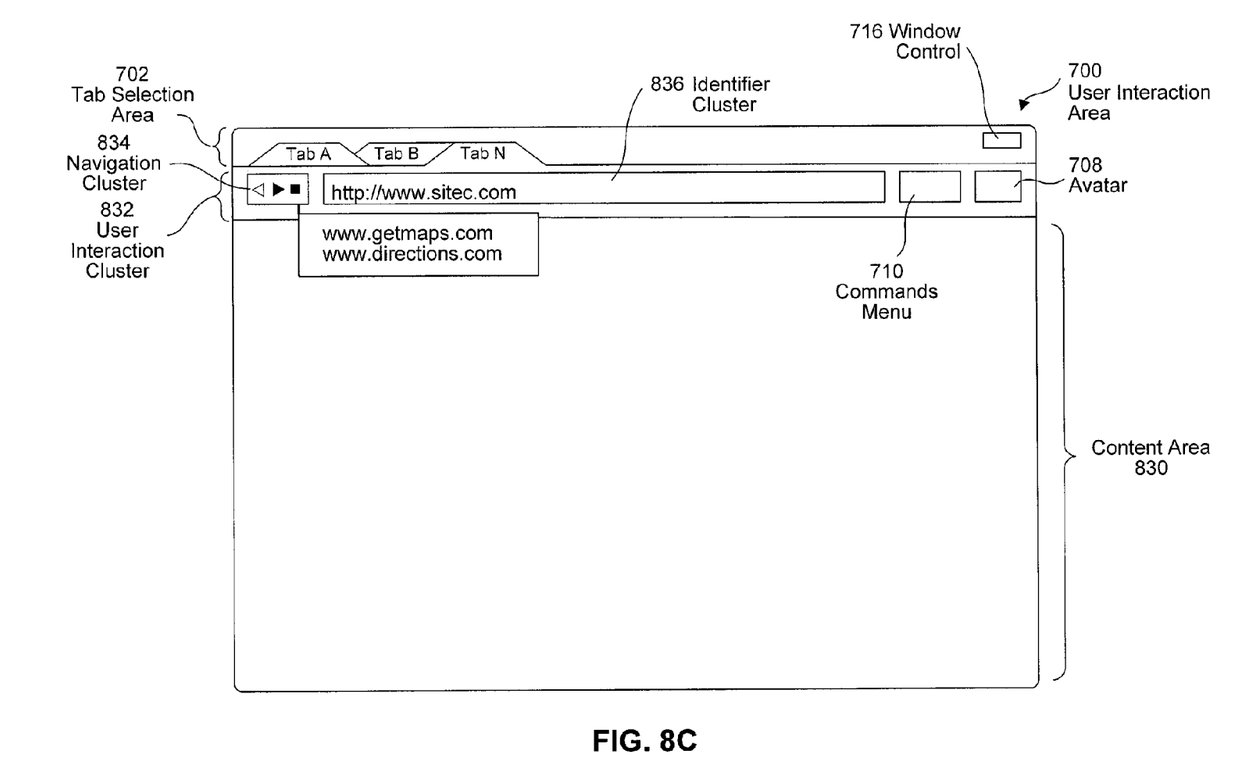

FIG. 8A through 8C are representative screenshots of user interface interaction area 700 of FIG. 7 with different example tabs selected. In each of the examples, the selected tab has a different sequence of visited pages associated with it. A user interaction cluster for each tab depends on the sequence of visited pages for that tab. Each tab contains the user interaction cluster and a content area. The user interaction cluster contains a navigation cluster and an identifier cluster. The navigation cluster, for example, may include a back button, a forward button, and a pages visited drop down menu. Whether the back button or the forward button are activated indicate whether the tab has any backward or forward history in the sequence of visited pages. The pages visited drop down menu shows the sequence of pages visited. The identifier cluster displays the identifier that addresses the content area associated with the tab.

Referring now to FIG. 8A, user interaction area 700 is shown with tab A selected. Tab A, for example, displays a user interaction cluster 812 and a content area 810. User interaction cluster 812 contains a navigation cluster 814 and an identifier cluster 816. Navigation cluster 814 contains a back button, a forward button, and a pages visited drop down menu. As shown in the example, the back button is activated, and the forward button is de-activated. This indicates that tab A has backward history but no forward history. The pages visited drop down menu shows the sequence of pages visited by tab A, which in the example shown are "www.hobbies.com", "www.sharephotos.com", and "www.myvideos.com". Identifier cluster 816 displays the identifier of content area 810. In the example shown, the identifier of content area 810 is "http://www.sitea.com".

Referring now to FIG. 8B, user interaction area 700 is shown with tab B selected. Tab B, for example, displays a user interaction cluster 822 and a content area 820. User interaction cluster 822 contains a navigation cluster 824 and an identifier cluster 826. Navigation cluster 824 contains a back button, a forward button, and a pages visited drop down menu. As shown in the example, the back button and the forward button are activated. This indicates that tab B has both backward history and forward history. The pages visited drop down menu shows the sequence of pages visited by tab B, which in the example shown are "www.mymusic.com" and "www.mp3.com". Identifier cluster 826 displays the identifier of content area 820. In the example shown, the identifier of content area 820 is "http://www.siteb.com".

Referring now to FIG. 8C, user interaction area 700 is shown with tab N selected. Tab N, for example, displays a user interaction cluster 832 and a content area 830. User interaction cluster 832 contains a navigation cluster 834 and an identifier cluster 836. Navigation cluster 834 contains a back button, a forward button, and a pages visited drop down menu. As shown in the example, the back button is de-activated, and the forward button is activated. This indicates that tab N has no backward history and has forward history. The pages visited drop down menu shows the sequence of pages visited by tab N, which in the example shown are "www.directions.com" and "www.getmaps.com". Identifier cluster 836 displays the identifier of content area 830. In the example shown, the identifier of content area 830 is "http://www.sitec.com".

As discussed earlier, if there were a single user interaction cluster for all the tabs, the single user interaction cluster would have to update each time the user switches tabs. Because each tab A-N has an associated user interaction cluster, there is no need to update a particular user interaction cluster as the user switches between tabs. As result, switching between tabs is less disorienting to the user.

Figure 9:
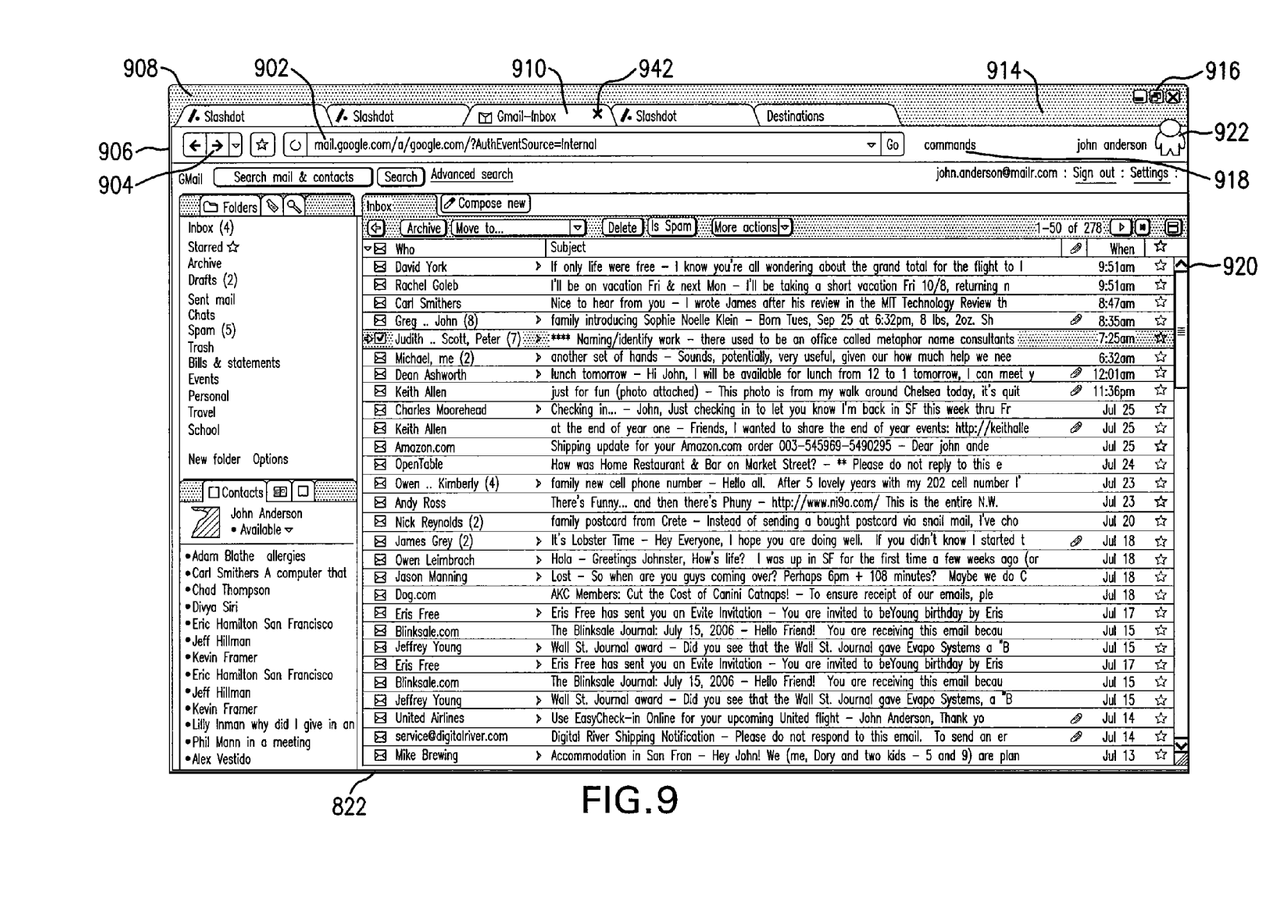
FIG. 9 is a screenshot of the user interface interaction area of FIG. 7 discussed in more detail.

FIG. 9 is a screenshot of the user interface interaction area of FIG. 7, which shows more detail.

The window title bar 908 contains the tabs instantiated by the user. Traditional window miniaturize, maximize and close buttons 916 located on the top right hand corner in this example. Window edges 906 and 920 can be used to resize the window in which the browser is instantiated. The content area contained in tab 910 is currently displayed in the browser as an example. Tab 910 contains a close button 942 which is used to close the instantiated tab. Additionally, the screenshot illustrates a navigation cluster 904, identifier cluster 902, commands menu 918, and avatar 922. Navigation cluster 904 provides navigation buttons such as forward, back and stop. Identifier cluster 902 may display the identifier of the current content area, reload the current content area, provide an input to navigate to a new identifier and/or retrieve an identifier from a history of past identifiers. Avatar 922 represents the current user profile as well as many other web browsing states. Avatar 922 may be generated using avatar manager 150 (FIG. 1). Commands menu 918 presents a list of other commands.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for providing tabbed views at a browser, comprising:
   a plurality of tabs positioned in a tab selection area adjacent to a top edge of a browser window; and
   for each tab in the plurality of tabs:
   a storage storing a sequence of pages that the tab has visited;
   at least one respective renderer that, in response to receipt of an identifier addressing content visited by the browser, selectively renders a user interaction cluster and a content area that displays the content addressed by the identifier depending on whether the respective tab is newly instantiated such that the user interaction cluster and content area are located within the respective tab,
   wherein the respective tab from the plurality of tabs contains the content area and the user interaction cluster related to the content area, the user interaction cluster including a navigation cluster that enables a user to control which web pages are displayed in the content area,
   wherein the respective navigation cluster includes a forward and a backward button, wherein the browser navigates to a page stored forward in the sequence of pages that the tab has visited when the forward is selected and navigates to a page stored backward in the sequence of pages that the tab has visited when the backward button is selected.

2. The system of claim 1, wherein each renderer comprises:
   a user interaction cluster renderer that renders the user interaction cluster only when the tab for the renderer is newly instantiated; and
   a content area renderer that renders the content area when receives an identifier addressing content visited by the browser regardless of whether the tab for the renderer is newly instantiated.

3. The system of claim 1, wherein an initial state of the browser includes at least one tab in the user interaction area.

4. The system of claim 1, wherein each user interaction cluster further includes an identifier cluster that displays the identifier of the content displayed in the content area of the respective tab, provides an input to retrieve an identified from a history of past identifiers of pages previously visited in the respective tab, and provides an input to specify an identifier to next visit in the respective tab.

5. The system of claim 1, wherein a tab positioned at a first position in the tab selection area is moved to a second position in the tab selection area in response to selecting and dragging the tab with an input device.

6. The system of claim 1, wherein each tab contains only one user interaction cluster.

7. The system of claim 1, wherein an avatar manager controls a user avatar rendered in the user interaction area.

8. The system of claim 7, wherein the avatar manager stores a user profile.

9. The system of claim 1, wherein the browser comprises a window interaction component that, when a tab is selected and dragged to a new position outside the tab selection area, communicates with a windowing system to instantiate a new window to display the selected and dragged tab at the new location.

10. The system of claim 1, wherein each user interaction cluster further includes an a commands menu that provides inputs to execute commands using content displayed in the content area of the respective tab, the commands including print, save, copy and paste.

11. A method for providing tabbed views at a browser, comprising:
  (a) receiving an identifier addressing content visited by the browser, the browser including a plurality of tabs positioned in a tab selection area adjacent to a top edge of a browser window;
  (b) in response to receipt of the identifier in (a), rendering selectively a user interaction cluster and a content area to display content addressed by the identifier depending upon whether a tab is newly instantiated such that the user interaction cluster and content area are rendered are located within the respective tab; and
  (c) storing the identifier in a sequence of pages that the tab has visited,
  wherein the tab contains the content area and the user interaction cluster, the user interaction cluster including a navigation cluster that enables a user to control which web pages are displayed in the content area,
  wherein the respective navigation cluster includes a forward and a backward button, wherein the browser navigates to a page stored forward in the sequence of pages that the respective tab has visited when the forward is selected and navigates to a page stored backward in the sequence of pages that the tab has visited when the backward button is selected.

12. The method of claim 11, wherein further comprising:
  (d) in response to receipt of an input selecting a tab and dragging the selected tab to a new position in the tab selection area, rearranging the tab selection area to render the tab at the new position.

13. The method of claim 11, further comprising:
  (d) controlling a user avatar rendered within the user interaction area.

14. The method of claim 11, further comprising:
  (d) when a tab is selected and dragged to a new position outside the tab selection area, communicating with a windowing system to instantiate a new window to display the selected and dragged tab at the new location.

15. The method of claim 11, wherein the user interaction and content area rendering comprises:
  (1) rendering the user interaction cluster and the content area if the tab is newly instantiated; and
  (2) rendering only the content area if the tab is not newly instantiated.

16. The method of claim 11, further comprising:
  (d) controlling a user avatar rendered within the user interaction area with a user profile.

17. A system that provides tabbed views, comprising:
  a computing device comprising at least one processor and memory;
  a renderer implemented on the computing device that renders a user interaction area including one or more tabs, renders a user interaction cluster within the tab, and renders a new content area when a new identifier is received such that the user interaction cluster and content area are rendered are located within the respective tab; and
  a storage storing a sequence of pages that the tab has visited;
  wherein the user interaction cluster comprises a navigation cluster includes a forward and a backward button, wherein the browser navigates to a page stored forward in the sequence of pages that the tab has visited when the forward is selected and navigates to a page stored backward in the sequence of pages that the tab has visited when the backward button is selected.

18. The system of claim 17, wherein content area displays content addressed by an identifier.

19. The system of claim 18, wherein the user interaction cluster further comprises:
  an identifier cluster that displays the identifier that addresses the content to be displayed in the content area.

\* \* \* \* \*